(12) United States Patent
Chang

(10) Patent No.: US 6,667,445 B2
(45) Date of Patent: Dec. 23, 2003

(54) HYDRAULIC WEIGHING MACHINE

(76) Inventor: Jiin-Lung Chang, No. 16-7, Kou-Tsao Lane, Kou-Tsao Li, Yuan-Lin Chen, Changhua Hsien (TW)

( * ) Notice: Subject to any disclaimer, the term of this patent is extended or adjusted under 35 U.S.C. 154(b) by 145 days.

(21) Appl. No.: 09/998,581

(22) Filed: Nov. 16, 2001

(65) Prior Publication Data

US 2003/0094314 A1 May 22, 2003

(51) Int. Cl.[7] .............................. G01G 5/00; G01G 5/04
(52) U.S. Cl. ............................................ 177/254
(58) Field of Search ................................ 177/208, 209, 177/254

(56) References Cited

U.S. PATENT DOCUMENTS

| | | | | |
|---|---|---|---|---|
| 3,378,090 A | * | 4/1968 | Christie | 177/164 |
| 3,378,091 A | * | 4/1968 | Caughley | 177/209 |
| 3,472,328 A | * | 10/1969 | Holman | 177/208 |
| 3,842,667 A | * | 10/1974 | Alexander et al. | 177/208 |
| 4,002,216 A | * | 1/1977 | Solow | 177/208 |
| 4,084,651 A | * | 4/1978 | Lagneau | 177/254 |
| 4,366,876 A | * | 1/1983 | Chen | 177/209 |
| 4,852,675 A | * | 8/1989 | Wang | 177/208 |
| 5,129,472 A | * | 7/1992 | Du et al. | 177/208 |
| 5,193,631 A | * | 3/1993 | Lannie et al. | 177/208 |
| 5,606,516 A | * | 2/1997 | Douglas et al. | 177/208 |
| 5,904,219 A | * | 5/1999 | Anahid et al. | 177/209 |
| 5,984,349 A | * | 11/1999 | Van Voorhies | 177/209 |

FOREIGN PATENT DOCUMENTS

| | | | | |
|---|---|---|---|---|
| GB | 2178861 A | * | 2/1987 | 177/208 |

* cited by examiner

*Primary Examiner*—Randy Gibson
(74) *Attorney, Agent, or Firm*—Christensen O'Connor; Johnson Kindness PLLC

(57) ABSTRACT

A hydraulic weighing machine includes a base, a weighing platform, an expandable bag, an upright stand, and a vertically extending weight scale. The expandable bag is disposed on a load bearing side of the base, and supports the weighing platform thereon. The bag is filled with a liquid body. When pressure is applied on top of the weighing platform, the bag will be pressed, and the liquid body in the bag will be forced to flow into a transparent tube of the weight scale so that the liquid level in the latter rises accordingly. Thus, an indication of the weight value corresponding to the amount of the applied pressure can be obtained from graduations of the weight scale.

18 Claims, 3 Drawing Sheets

HYDRAULIC WEIGHING MACHINE

BACKGROUND OF THE INVENTION

1. Field of the Invention

The invention relates to a weighing machine, more particularly to a hydraulic weighing machine that is both durable and precise.

2. Description of the Related Art

A conventional weighing machine, e.g. a spring balance scale, is usually composed of a scale plate and a plurality of levers and springs that cooperate such that, when the user places a load on the weighing machine, the load will be transferred to the levers in order to move a pointer relative to the scale plate so as to indicate the weight of the load.

It is noted that the levers used in the conventional weighing machine are susceptible to wearing and the springs are susceptible to elastic fatigue such that the sensitivity of the weighing machine will decrease and the weighing machine will be unable to show the precise weight of the load after a period of use.

SUMMARY OF THE INVENTION

Therefore, the main object of the present invention is to provide a hydraulic weighing machine which is capable of overcoming the aforesaid drawbacks of the prior art.

Accordingly, the hydraulic weighing machine of this invention comprises a base, a weighing platform, an expandable bag, an upright stand, and a vertically extending weight scale. The base has a load bearing side. The weighing platform is disposed on the load bearing side of the base. The expandable bag is disposed on the load bearing side of the base, and supports the weighing platform thereon. The bag is filled with a liquid body. The upright stand is disposed adjacent to the base. The vertically extending weight scale includes a transparent tube that has a bottom end in fluid communication with the bag and a top end hung on the stand. The weight scale further includes a set of graduations to indicate a weight value corresponding to liquid level in the tube. When pressure is applied on top of the weighing platform, the bag will be pressed toward the load bearing side of the base, and the liquid body in the bag will be forced to flow into the tube so that the liquid level in the tube rises accordingly. Thus, an indication of the weight value corresponding to the amount of the applied pressure can be obtained from the graduations.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
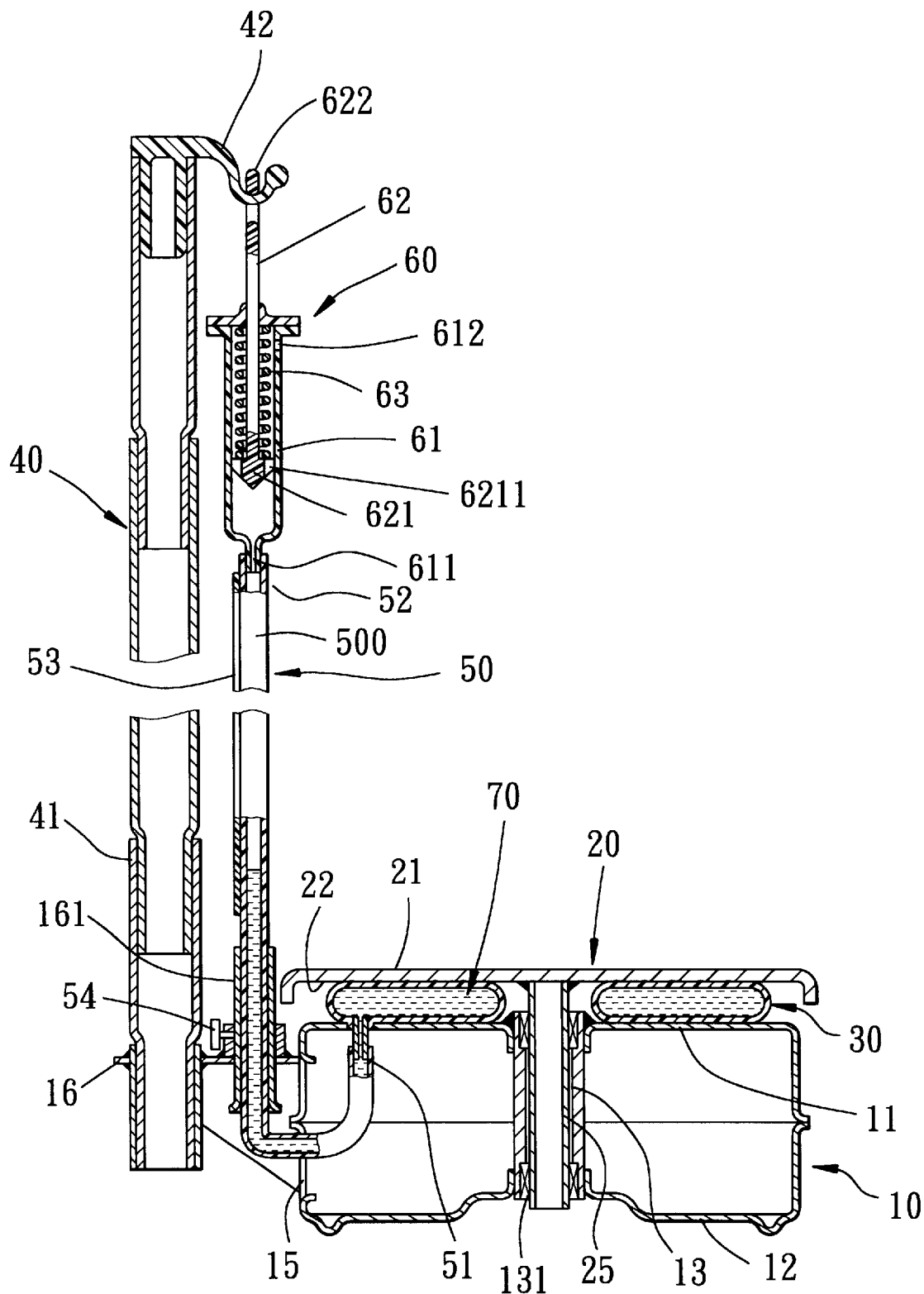
FIG. 1 is a longitudinal sectional view of the preferred embodiment of a hydraulic weighing machine according to the present invention.
Figure 2:
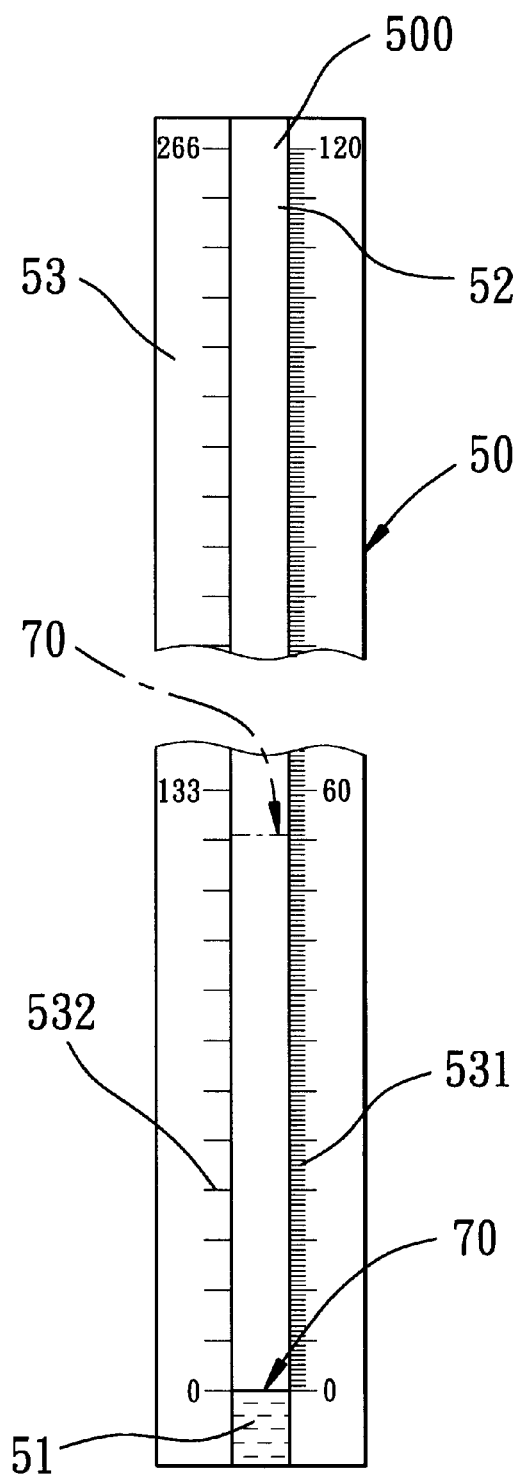
FIG. 2 is a schematic view of a weight scale of the preferred embodiment.

Referring to FIGS. 1 and 2, the preferred embodiment of a hydraulic weighing machine according to this invention is shown to comprise a base 10, a weighing platform 20, an expandable bag 30, an upright stand 40, a vertically extending weight scale 50 including a transparent tube 500 and a set of graduations 531, 532, and an exhaust valve 60.

The base 10, which is hollow, has a load bearing side 11, a ground contacting side 12 opposite to the load bearing side 11, and a coupling hole 13 that extends from the load bearing side 11 through the ground contacting side 12. The base 10 further has a rear side formed with a tube hole 15. A lateral mounting plate 16 extends horizontally and rearwardly from the base 10, and has a tube mounting sleeve 161 mounted uprightly thereon. The tube mounting sleeve 161 is preferably made of stainless steel.

The weighing platform 20 is disposed on top of the load bearing side 11 of the base 10, and has a top side 21 and a bottom side 22. A coupling shaft 25 extends downwardly from the bottom side 22 and into the coupling hole 13. Bearings 131 are mounted in the coupling hole 13 to permit vertical sliding movement of the coupling shaft 25 relative to the base 10.

The expandable bag 30, in the shape of a hollow ring in this embodiment, is disposed between the load bearing side 11 of the base 10 and the bottom side 22 of the weighing platform 20, and supports the weighing platform 20 thereon. The bag 30 is filled with a liquid body 70, such as water or oil.

The upright stand 40 is disposed adjacent to the base 10, and includes a plurality of interconnected tubular stand sections 41. An uppermost one of the stand sections 41 is formed with a hook 42. A lowermost one of the stand sections 41 is mounted on the lateral mounting plate 16.

The tube 500 has a bottom end 51 extending through the mounting sleeve 161 and into the base 10 via the tube hole 15 so as to connect fluidly with the bag 30. The tube 500 further has a top end 52 to be hung on the stand 40. A ruler 53 is adhered to the tube 500, and is formed with the graduations 531, 532. The graduations 531, 532 are used to indicate a weight value corresponding to liquid level in the tube 500 in the metric and British systems, respectively. Preferably, the mounting sleeve 161 is bonded integrally to the tube 500, and a screw 54 is used to mount the mounting sleeve 161 movably on the mounting plate 16 such that the tube 500 can be adjusted vertically on the mounting plate 16.

The exhaust valve 60, which is mounted on the top end 52 of the tube 500, includes a tubular valve housing 61, and a piston rod 62 and a compression spring 63 disposed in the valve housing 61, respectively. The valve housing 61 has a lower end portion formed with a valve inlet 611 that is coupled to the top end 52 of the tube 500 so as to establish fluid communication with the tube 500, and an upper end portion opposite to the lower end portion and formed with a radial air vent 612. The piston rod 62 has an upper rod part 622 that is hung removably on the upright stand 40, and a lower rod part that extends movably into the upper end portion of the valve housing 61 and that is provided with a piston 621. The piston 621 is formed with a plurality of radial outward ribs 6211 that extend in radial outward directions toward the valve housing 61. The compression spring 63 is sleeved on the lower rod part of the piston rod 62 for biasing the piston 621 to close the valve inlet 611 when the upper rod part 622 of the piston rod 62 is detached from the upright stand 40 to prevent leakage of liquid. Accordingly, when the upper rod part 622 of the piston rod 62 is hung on the hook 42, the piston 621 will be pulled upwardly to compress the spring 63 and to open the valve inlet 611, thereby allowing air in the tube 500 to flow through the valve inlet 611, to pass through spaces among the ribs 6211, and to exit the valve housing 61 via the air vent 612.

Figure 3:
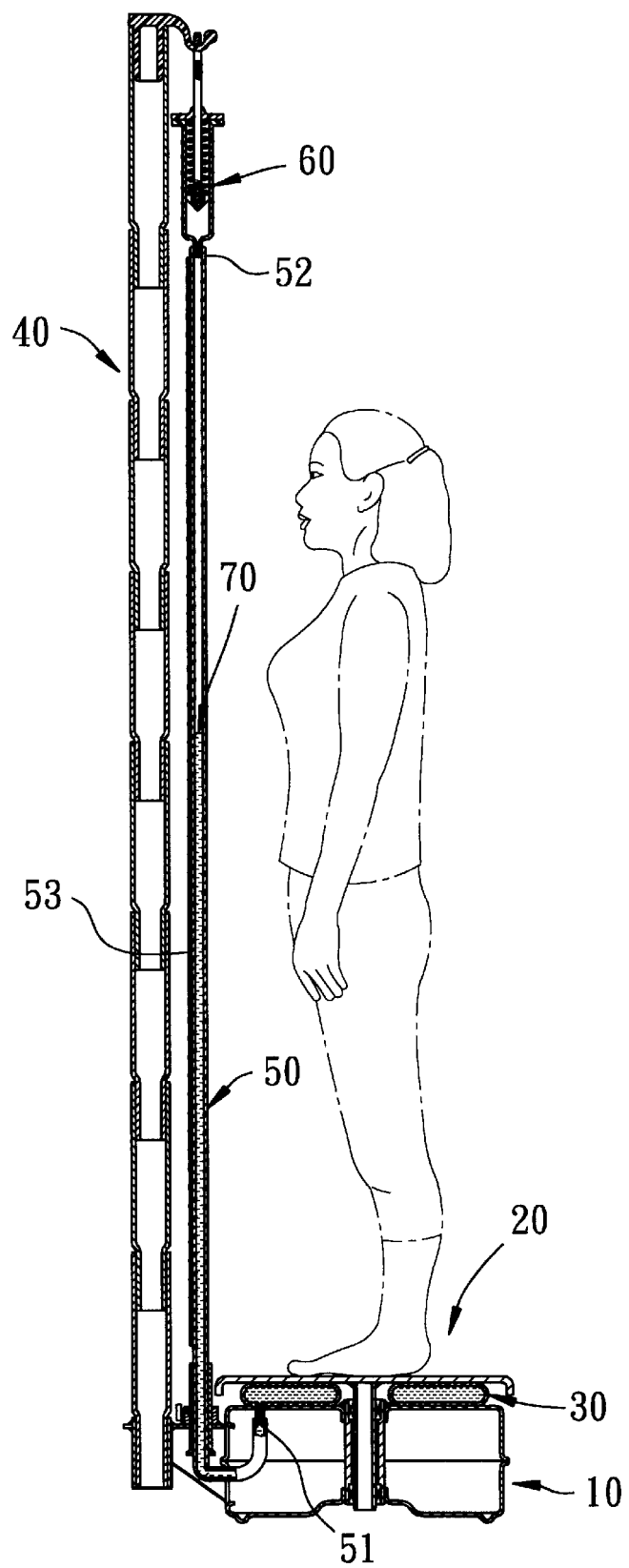
FIG. 3 is a sectional view showing the preferred embodiment in a state of use.

Prior to use, the screw 54 is loosened, and the position of the mounting sleeve 161 and the tube 500 on the mounting plate 16 is adjusted so that the liquid level in the tube 500 is aligned with zero marks of the graduations 531, 532 of the ruler 53. The screw 54 is then tightened to complete calibration of the weighing machine. With further reference to FIG. 3, when pressure is applied on the top side 21 of the weighing platform 20, the bag 30 will be pressed toward the load bearing side 11 of the base 10, and the liquid body 70 in the bag 30 will be forced to flow into the tube 500 so that the liquid level in the tube 500 rises accordingly. Thus, an indication of the weight value corresponding to the amount of the applied pressure can be obtained from the graduations 531, 532 of the ruler 53.

In summary, some of the advantages of the machine of this invention are as follows:

1. The hydraulic weighing machine of this invention puts into practice the principle of hydraulic equilibrium, i.e. pressure on a liquid body results in corresponding liquid displacement. Since the liquid displacement does not result in mechanical wear, durability of the weighing machine can be ensured.

2. When the bag 30 is pressed, the liquid body 70 will be prompted to flow into the tube 500 such that liquid level in the latter quickly ascends and stabilizes to a height that reflects hydraulic equilibrium. As such, the hydraulic weighing machine of this invention possesses high sensitivity and precision when used in weighing loads.

3. The upright stand 40 can be disassembled into a plurality of stand sections 41. The weight scale 50 is flexible and can be wound into a coil, and the exhaust valve 60 can seal the tube 500 to prevent leakage of liquid. Therefore, the hydraulic weighing machine of this invention facilitates storage and transport of the same.

The machine of this invention can be also used as a teaching aid to show the relation between pressure and area.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A hydraulic weighing machine comprising:

a base having a load bearing side;

a weighing platform disposed on top of said load bearing side of said base;

an expandable bag disposed on said load bearing side of said base and supporting said weighing platform thereon, said bag being filled with a liquid body;

an upright stand disposed adjacent to said base; and a vertically extending weight scale including a transparent tube having a bottom end in fluid communication with said bag, and a top end hung on said stand, said weight scale further including a set of graduations to indicate a weight value corresponding to liquid level in said tube;

whereby, when pressure is applied on top of said weighing platform, said bag will be pressed toward said load bearing side of said base, and said liquid body in said bag will be forced to flow into said tube so that the liquid level in said tube rises accordingly, an indication of the weight value corresponding to the amount of the applied pressure being obtained from said graduations, wherein:

said base further has a ground contacting side opposite to said load bearing side, and a coupling hole that extends from said load bearing side through said ground contacting side;

said bag being formed with a shaft hole that is coaxial with said coupling hole;

said weighing platform being formed with a downwardly extending coupling shaft that extends through said shaft hole and that extends slidably into said coupling hole.

2. The hydraulic weighing machine as claimed in claim 1, wherein said tube is flexible and is made of plastic.

3. The hydraulic weighing machine as claimed in claim 1, further comprising an exhaust valve mounted on said top end of said tube.

4. The hydraulic weighing machine as claimed in claim 1, wherein said liquid body is water.

5. The hydraulic weighing machine as claimed in claim 1, wherein said liquid body is oil.

6. A hydraulic weighing machine comprising:

a base having a load bearing side;

a weighing platform disposed on top of said load bearing side of said base;

an expandable bag disposed on said load bearing side of said base and supporting said weighing platform thereon, said bag being filled with a liquid body;

an upright stand disposed adjacent to said base; and a vertically extending weight scale including a transparent tube having a bottom end in fluid communication with said bag, and a top end hung on said stand, said weight scale further including a set of graduations to indicate a weight value corresponding to liquid level in said tube;

whereby, when pressure is applied on top of said weighing platform, said bag will be pressed toward said load bearing side of said base, and said liquid body in said bag will be forced to flow into said tube so that the liquid level in said tube rises accordingly, an indication of the weight value corresponding to the amount of the applied pressure being obtained from said graduations;

wherein said base is formed with a lateral mounting plate, said lateral mounting plate having a tube mounting sleeve mounted uprightly thereon, said bottom end of said tube extending through said tube mounting sleeve.

7. The hydraulic weighing machine as claimed in claim 6, wherein said base is hollow and is further formed with a tube hole disposed adjacent to said lateral mounting plate, said bottom end of said tube further extending into said base via said tube hole to connect fluidly with said bag.

8. The hydraulic weighing machine as claimed in claim 6, wherein said stand includes a plurality of interconnected tubular stand sections, a lowermost one of said stand sections being mounted on said lateral mounting plate.

9. The hydraulic weighing machine as claimed in claim 6, wherein:

said base further has a ground contacting side opposite to said load bearing side, and a coupling hole that extends from said load bearing side through said ground contacting side;

said bag being formed with a shaft hole that is coaxial with said coupling hole;

said weighing platform being formed with a downwardly extending coupling shaft that extends through said shaft hole and that extends slidably into said coupling hole.

10. The hydraulic weighing machine as claimed in claim 6, wherein said tube is flexible and is made of plastic.

11. The hydraulic weighing machine as claimed in claim 6, further comprising an exhaust valve mounted on said top end of said tube.

12. The hydraulic weighing machine as claimed in claim 6, wherein said liquid body is water.

13. The hydraulic weighing machine as claimed in claim 6, wherein said liquid body is oil.

14. A hydraulic weighing machine comprising:

a base having a load bearing side;

a weighing platform disposed on top of said load bearing side of said base;

an expandable bag disposed on said load bearing side of said base and supporting said weighing platform thereon, said bag being filled with a liquid body;

an upright stand disposed adjacent to said base; and a vertically extending weight scale including a transparent tube having a bottom end in fluid communication with said bag, and a top end hung on said stand, said weight scale further including a set of graduations to indicate a weight value corresponding to liquid level in said tube;

whereby, when pressure is applied on top of said weighing platform, said bag will be pressed toward said load bearing side of said base, and said liquid body in said bag will be forced to flow into said tube so that the liquid level in said tube rises accordingly, an indication of the weight value corresponding to the amount of the applied pressure being obtained from said graduations;

further comprising an exhaust valve mounted on said top end of said tube, wherein said exhaust valve includes:

a tubular valve housing having a lower end portion formed with a valve inlet that is coupled to said top end of said tube so as to establish fluid communication with said tube, and an upper end portion opposite to said lower end portion and formed with an air vent;

a piston rod having an upper rod part that is hung removably on said upright stand, and a lower rod part that extends movably into said upper end portion of said valve housing and that is provided with a piston, said piston being formed with a plurality of radial outward ribs that extend in radial outward directions toward said valve housing; and a compression spring sleeved on said lower rod part of said piston rod for biasing said piston to close said valve inlet when said upper rod part of said piston rod is detached from said upright stand.

15. The hydraulic weighing machine as claimed in claim 14, wherein:

said base further has a ground contacting side opposite to said load bearing side, and a coupling hole that extends from said load bearing side through said ground contacting side;

said bag being formed with a shaft hole that is coaxial with said coupling hole;

said weighing platform being formed with a downwardly extending coupling shaft that extends through said shaft hole and that extends slidably into said coupling hole.

16. The hydraulic weighing machine as claimed in claim 14, wherein said tube is flexible and is made of plastic.

17. The hydraulic weighing machine as claimed in claim 14, wherein said liquid body is water.

18. The hydraulic weighing machine as claimed in claim 14, wherein said liquid body is oil.

* * * * *